United States Patent [19]

Eshleman

[11] 4,337,107
[45] Jun. 29, 1982

[54] ABRASION-RESISTANT TRANSFER LAMINATING SHEET MATERIAL

[75] Inventor: Ronald J. Eshleman, Stillwater, Minn.

[73] Assignee: Minnesota Mining and Manufacturing Company, St. Paul, Minn.

[21] Appl. No.: 160,136

[22] Filed: Jun. 16, 1980

[51] Int. Cl.³ .................... A61F 13/02; B29B 31/00; B32B 31/00; C61F 13/02
[52] U.S. Cl. .................. 156/249; 106/287.16; 156/231; 156/289; 428/40; 428/413; 428/447; 428/914
[58] Field of Search ............... 428/40, 41, 42, 142, 428/413, 447, 46, 914; 556/401; 528/10; 260/348.41; 252/407; 156/230, 238, 249, 247, 289, 231; 106/287.16

[56] References Cited

U.S. PATENT DOCUMENTS

| | | | |
|---|---|---|---|
| 3,926,707 | 12/1975 | Glaser et al. | 156/247 |
| 4,049,861 | 9/1977 | Nozari | 428/413 |
| 4,090,464 | 5/1978 | Bishopp et al. | 428/40 |
| 4,101,513 | 7/1978 | Fox et al. | 528/12 |
| 4,130,690 | 12/1978 | Lien et al. | 428/447 |
| 4,167,617 | 9/1979 | Siefken | 260/348.41 |
| 4,179,324 | 12/1979 | Kirkpatrick | 156/230 |
| 4,215,170 | 7/1980 | Oliva | 156/230 |

FOREIGN PATENT DOCUMENTS 736504  6/1966  Canada .............................. 556/401

OTHER PUBLICATIONS

Condor, Terrence M.; SN 956,081; Filed Oct. 30, 1978.

Primary Examiner—Edward C. Kimlin
Assistant Examiner—Louis Falasco
Attorney, Agent, or Firm—Cruzan Alexander; Donald M. Sell; Lorraine R. Sherman

[57] ABSTRACT

Flexible mar-resistant transferable laminating sheet materials comprise multilayers, said layers being a strippable carrier substrate, an epoxy-terminated silane abrasion-resistant polymer with improved weathering properties, a pressure-sensitive adhesive, and a release sheet.

14 Claims, 1 Drawing Figure

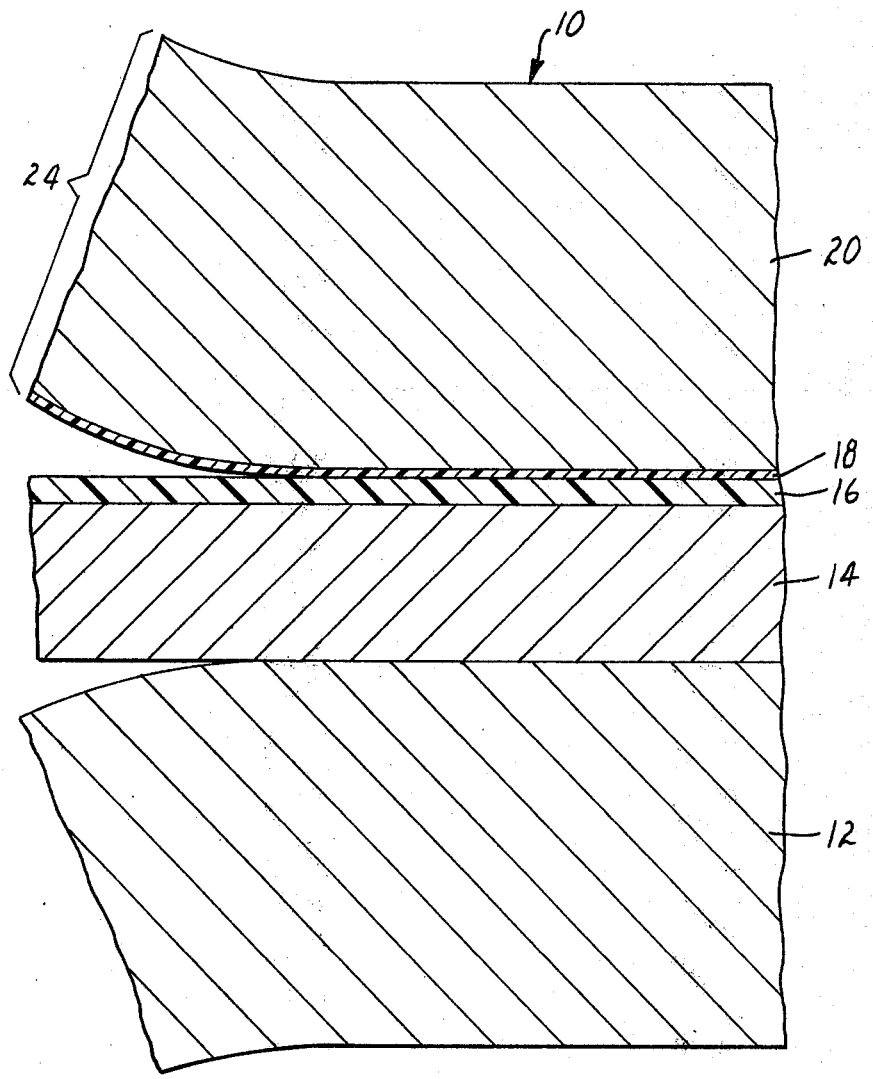

ABRASION-RESISTANT TRANSFER LAMINATING SHEET MATERIAL

TECHNICAL FIELD

This invention relates to flexible mar-resistant transferable laminating sheet materials. A multilayered sheet material is provided which is able to afford desired abrasion-resistance to substrates when the multilayered sheet is adhered thereto.

BACKGROUND ART

Epoxy-terminated silane abrasion-resistant polymers have recently been reported in the art. U.S. Pat. Nos. 4,049,861 and 4,130,690 disclose polymers derived from monomers of the formulae:

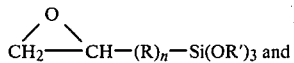

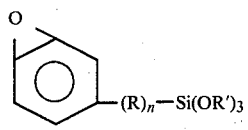

wherein R and R' are alkylene and alkyl respectively and n is zero or one. The polymers disclosed in these patents are polymers which represent significant improvements over those in prior art coatings. However, these abrasion-resistant coatings often must be solvent coated or sprayed upon a substrate, a primer being necessary in some cases. In addition, these abrasion-resistant coatings require in situ curing. Also, these abrasion-resistant coatings generally are subject to cracking upon aging, which is referred to in the art as weathering.

Pressure-sensitive flexible adhesive-coated sheet materials are well known in the art. For example, U.S. Pat. Re. No. 24,906, U.S. Pat. Nos. 2,814,601 and 3,925,283 disclose adhesive coated materials which use particularly desirable acrylate, siloxane, and urethane pressure-sensitive adhesives.

It has often been necessary in the prior art to provide a primer between a coating and its substrate because of lack of adhesion between them. U.S. Pat. No. 4,118,536 discloses silane-terminated polycarbodiimide primers and composite coatings therefrom which are useful for a variety of substrates and for many different coating materials. These primers are disclosed as useful with the epoxy-terminated silanes described in the present invention.

The composite sheet materials of the present invention overcome the necessity of priming and in situ curing, and improve weathering properties of the coating.

DISCLOSURE OF THE INVENTION

The present invention provides a simple method of applying a "hard coat" or abrasion-resistant (AR) film having improved weathering properties to many types of solid substrates, which method requires neither priming nor in situ curing, and avoids solvent coating or spraying.

The present invention relates to a transferable laminating sheet material which comprises, in sequence:
a. a strippable carrier substrate,
b. an abrasion-resistant layer of 0.05 to 1.00 mils (1.3 μm–25.4 μm) thickness comprising a polymer, said polymer having
  (1) 25–60% by weight of its units derived from epoxy-terminated silanes of the formulae

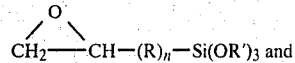

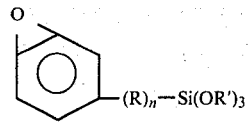

wherein R is a non-hydrolyzable divalent radical (aliphatic, aromatic, or mixed aliphatic and aromatic) of one to less than 20 carbon atoms composed of only C and O atoms in the backbone of R and no more than one atom of O for every two C atoms and no adjacent O atoms in the backbone, n is zero or one, and R' is alkyl of 1 to 8 carbon atoms,
  (2) 40–75% by weight units derived from epoxidized organic compounds other than epoxy silanes, and
  (3) from 0.1 to 5% by weight of an antioxidant;
c. a pressure-sensitive adhesive of from 0.02–0.50 mils (0.5 μm–13 μm) thickness adhered to said abrasion-resistant layer, and
d. a strippable release sheet comprising a liner substrate and a low adhesion backsize.

Abrasion-resistant coatings of the present invention may be cured by a wide variety of catalysts known in the art. A catalytically effective amount of a Bronsted acid may be used, strong Bronsted acids being preferred. Suitable catalysts useful for curing epoxy-terminated silanes are disclosed in the art, for example, in U.S. Pat. Nos. 3,955,035; 4,049,861; 4,101,513; and 4,130,690. Even moderate strength Bronsted acids are useful, their cure merely being somewhat slower. "Strong" Bronsted acid as used herein refers to a Bronsted acid of pKa between 1 and 3. "Moderate" Bronsted acid as used herein refers to a Bronsted acid of pka between 3 and 5.

Laminable coatings require flexibility to avoid undesirable cracking developing in them. Prior art abrasion-resistant coatings are very brittle and suffer cracking when subjected to lamination. Introducing flexibility (e.g., by use of flexibilizing agents or by altering the polymer formulation) to allow lamination causes these coatings to suffer some loss of abrasion-resistance. Applicants have discovered that use of certain antioxidants in abrasion-resistant coatings allows for lamination of these brittle coatings without sacrificing abrasion-resistant properties and, in addition, provides improved resistance to cracking. Also, as will be described below in detail, applicants have found that use of antioxidants provides abrasion-resistant coatings that are stable towards aging, said abrasion-resistant coatings to be derived from precondensed monomers that are 35–95% hydrolyzed rather than at least 90% hydrolyzed as was required in prior art coatings. Further, use of antioxidants allows for the preparation of abrasion-resistant coatings that consistently possess desired abrasion-resistant properties. Consistency of properties was often lacking in prior art abrasion-resistant compositions.

The present invention provides mar-resistant transfer laminating sheet materials having high performance characteristics. They remain stable upon aging, have optical clarity, and provide excellent adhesion. These flexible sheet materials may be pressure and/or heat laminated as a thin layer to a surface which is to be made abrasion resistant. The present invention provides a practical handling method during the application of extremely thin protective scratch-resistant coatings.

BRIEF DESCRIPTION OF THE DRAWING

The typical sheet material of the present invention may be a multilayered sheet comprising a plurality of layers.

The drawing is an enlarged cross-section view of the composite layers of a flexible mar-resistant transfer laminating sheet material of the present invention.

DETAILED DESCRIPTION OF THE DRAWING

The drawing shows one embodiment 10 of the present invention. An abrasion-resistant polymer 14, described in detail below, may be coated on a suitable strippable carrier substrate 12 to which it does not adhere strongly. The release force between the abrasion-resistant coating peeled at a 180° angle from the strippable carrier substrate is <25 g/2.54 cm width. Such carrier substrates may be films of polyethylene terephthalate, polypropylene, or polyethylene, for example. The cast abrasion resistant film 14 is then overcoated with an acrylate, silicone, or urethane pressure-sensitive adhesive 16 known in the art. After the coated layer is dried, a suitable strippable release sheet 24 comprised of a liner substrate 20 and a low adhesion backsize coating 18 is laminated to the adhesive 16 to prevent contamination by atmospheric dust and dirt. Suitable liner substrates include films of polyethylene terephthalate, polypropylene, polyethylene, and also paper. A surface may be made mar-resistant by peeling off the release sheet and laminating the remaining sheet material to the new solid substrate by applying heat and pressure. The carrier substrate 12 is then peeled away leaving a thin, highly scratch-resistant coating on the new solid substrate. The abrasion-resistant coating requires no in situ curing.

DETAILED DESCRIPTION OF THE INVENTION

Abrasion and solvent-resistant coatings present in the transfer laminating sheet materials of the present invention are disclosed in U.S. Pat. No. 4,130,690.

The present invention provides a flexible abrasion-resistant transferable laminating sheet material which is a multilayered sheet comprising in sequence a. a strippable carrier substrate;
b. an abrasion-resistant coating on a carrier substrate wherein said coating is from 0.05-1.00 mils (1.3 μm-25.4 μm) thick and comprises a polymer which has at most 30% haze according to ASTM D 968-51 using 1 liter of sand in 10-11 seconds, said polymer having (1) 25-60% by weight units derived from precondensed monomers which are epoxy-terminated silanes of the formulae

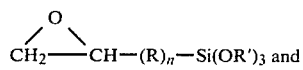
CH$_2$—CH—(R)$_n$—Si(OR')$_3$ and

-continued

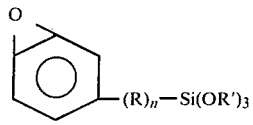
(R)$_n$—Si(OR')$_3$ wherein R is selected from alkylene of 1 to 10 carbon atoms, and preferably it is selected from alkylene of 2 to 8 carbon atoms and —CH$_2$—O—(CH$_2$)$_m$, wherein m is 1 to 5 carbon atoms; R' is alkyl of 1 to 8 carbon atoms and preferably it is alkyl of 1 to 4 carbon atoms; n is one, and (2) 40-75% by weight units derived from epoxidized organic compounds other than epoxy silanes, and
(3) from 0.1 to 5% by weight of an antioxidant, c. a coated pressure-sensitive adhesive layer which is from 0.02-0.50 mils (0.5 μm-13 μm) thick; and
d. a strippable release sheet comprised of a liner substrate with a low adhesion backsize;

wherein
the release force between the abrasion-resistant coating, peeled at a 180° angle, and the carrier substrate is <25 g/2.54 cm width, and
the release force between the release sheet, peeled at a 180° angle, and the pressure-sensitive adhesive coating is <10 g/2.54 cm width.

In addition to any of the above silanes the polymers of this invention can be derived from any hydrolyzate or precondensate of the said silanes. These hydrolyzates can be formed by the partial or complete hydrolysis of the silane OR' groups. Thus, the term precondensate (hereinafter sometimes referred to as precon) includes siloxanes in which some or all of the silicon atoms are bonded to other silicon atoms through oxygen atoms.

Preferably, the final polymer product will have 25-60% by weight of its units derived from precondensed monomers which are epoxy-terminated silanes. The remaining units (i.e., 40-75% units by weight) are derived from epoxidized organic compounds other than epoxy silanes. The haze value of the coating should not exceed 30% according to ASTM D 968-51 using 1 liter of sand over 10-11 seconds. Preferably, the haze value should be less than 20%.

It is preferred that the final polymer product have 40-55% by weight of its units derived from precondensed monomers and 45-60% by weight of its units derived from epoxidized organic compounds other than epoxy silanes. Most preferably, the final polymer product has 55-60% by weight of its units derived from precondensates of the epoxy-silane monomers and 40-45% by weight of its units derived from epoxidized organic compounds other than epoxy silanes. In order to maximize stability of the polymer towards aging, it is preferable that the monomers be precondensates that are 35-95% hydrolyzed (i.e., have 35-95% of the alkoxy groups formed with R' removed), most preferably that they be 60-95% hydrolyzed.

As mention above, the abrasion-resistant coatings of the present invention are cured in the presence of Bronsted acids. Most preferably the abrasion-resistant polymers are cured in the presence of a catalytically effective amount of bis(trifluoromethylsulfonyl)phenyl methane [(CF$_3$SO$_2$)$_2$CHC$_6$H$_5$].

Percent by weight epoxide and percent by weight epoxide resin as herein used refer to percent by weight of epoxidized organic compounds other than epoxy silanes.

These abrasion-resistant polymers may be stabilized towards aging by the addition of from 0.1 to 5% by weight of an antioxidant. Aging as herein used refers to the development of cracks in the sample. Suitable antioxidants include those of the following types: thiophenols, hydroxyalkylphenols, aromatic amines, thioesters, phosphites, hydroquinones, and polyphenols. Useful antioxidants include 4,4'-thiobis(6-tert-butyl-m-cresol) (TBC), 4-hydroxymethyl-2,6-di-tert-butylphenol (HBP), alkyl substituted diphenylamine (APA), dilaurylthiodipropionate (DLTDP), tris(nonylphenyl) phosphite (TNP), 2,5-di-tert-amylhydroquinone (DAH), and 1,3,5-trimethyl-2,4,6-tris(3,5-di-tert-butyl-4-hydroxybenzyl)benzene (BHB). The preferred antioxidants in the practice of the invention are TBC, DLTDP, and HBP, with the most preferred being TBC. Amounts from 0.25 to 2% by weight are preferred. Use of about 1% by weight of antioxidant is an optimum amount. Much higher levels (up to 10%) showed no further benefit and, in some cases, deleterious effects were noted.

The abrasion-resistant formulation described above may be coated on any suitable carrier substrate using any technique known in the art. For example, rotogravure coating technique was used on a laboratory coater. Curing conditions were 100° F. (38° C.) zone 1, 160° F. (71° C.) zone 2 and zone 3. Web speed was 9 ft/min (2.74 m/min) for a total oven time of 4 minutes.

Solid substrates that can be coated by transfer lamination are the surfaces of fiber reinforced sheets, and essentially any substantially smooth, preferably flat, solid object. Among the solid substrates particularly useful according to the present invention are ceramic materials (e.g., glass, fused ceramic sheeting, and fiber reinforced sheets), metals (e.g., sheets and fibrous mats of aluminum, iron, silver, chromium, and other metals), metal oxides, thermoplastic resins, (e.g., polyesters, polyamides, polyolefins, polycarbonates, acrylic resins, polyvinyl chloride, cellulose acetate butyrate, etc.), thermoset resins (e.g., epoxy resins, polysilanes, polysiloxanes, etc.), paper, wood, natural resins (e.g., rubber, gelatin) and, in general, any substantially smooth, preferably flat, solid surface which needs protection from abrasion.

Among other preferred substrates to be transfer laminated in the present invention are painted surfaces (including acrylic auto paints), marble surfaces, polyesters (e.g., polyethylene terephthalate), finished photographic products (by definition, prints, films, transparencies, negatives, microfiche, motion picture film, microfilm, and the like), and works of art.

Pressure-sensitive adhesives useful in the flexible mar-resistant transfer laminating materials of the present invention may be any pressure-sensitive adhesive, for example, acrylate, siloxane, or urethane adhesives. The pressure-sensitive adhesive may be laminated to a release sheet, as shown in the drawing, in order to prevent contamination of the adhesive layer by dust and dirt prior to use (or application).

Lamination is accomplished by removal of the release sheet to expose the adhesive layer, contacting the adhesive layer with the substrate to be protected, and applying pressure to the sheet material. Lamination can be effected at room temperature using squeeze rolls on a laboratory laminator. Superior initial optical properties and adhesion were realized at laminating temperatures of 100° F.-150° F. (38° C.-66° C.). After lamination, the carrier substrate was removed easily and cleanly, leaving the scratch-resistant layer and adhesive attached to the surface desired to be made mar-resistant.

The practice of this invention provides an extremely thin and flexible protective scratch-resistant coating on a surface. To maintain flexibility of the mar-resistant transfer laminating sheet material the upper limit of thickness of the abrasion-resistant (AR) layer is 1.0 mil (25 μm), and of the pressure-sensitive layer (PSA) the upper limit of thickness is 0.5 mil (13 μm). At the other end of the range, insufficient adhesion occurs with the PSA layer at less than 0.02 mils (0.5 μm) thickness. Successful transfer films have been prepared at 0.05 mil (1.3 μm) AR layer thickness.

The following table gives data on usefulness of various thicknesses of AR and PSA layers.

TABLE I

| Relative AR and PSA Thickness Data | | |
|---|---|---|
| | AR Thickness In Mils (μm) | PSA Thickness In Mils (μm) |
| Most Preferred | 0.10–0.40(2.5–10.0) | 0.04–0.15(1–3.8) |
| Less Preferred | 0.05–0.10(1.27–2.5) | 0.02–0.04(0.5–1) |
| Least Preferred | 0.40–1.00(10–25) | 0.15–0.50(3.8–12.7) |

Useful AR:PSA thickness ratios are 10:1 to 0.5:1 with the preferred AR:PSA thickness ratios being 5:1–2:1.

Understanding of the invention will be further enhanced by referring to the following illustrative but non-limiting examples.

EXAMPLES 1–11

The following examples demonstrate the stabilizing influence of antioxidants.

An abrasion-resistant coating composition of the following formulation was prepared and applied to a polyester film substrate by a precision die coater. The composition was 60% by weight of precondensate (hydrolyzed and condensed gamma-glycidoxypropyltrimethoxysilane, hereinafter referred to as GPMS) and 40% by weight epoxide.

Composition A 270.0 g AR precondensate lot 57 (50% hydrolyzed and condensed GPMS) MeO:Si=1.2:1
180.0 g 3,4 epoxycyclohexylmethyl-3,4-epoxycyclohexanecarboxylate (EEC)
1050.0 g isopropyl acetate solvent
1.80 g inert fluorinated alkyl ester nonionic surfactant at 25% solids in isopropyl acetate (available from 3M)
67.50 g bis(trifluoromethylsulfonyl)phenyl methane [$(CF_3SO_2)_2CHC_6H_5$] at 10% solids in isopropyl acetate The coating was cured 1½ minutes at 100° F. (38° C.) and 1½ additional minutes at 140° F. (60° C.) in a two zone oven. The cured cast abrasion-resistant film on its polyester carrier was about 0.15 mils (3.8 μm) thick and had a measured coating weight of 450 mg/ft$^2$ (4845 mg/m$^2$).

The cast AR film was then overcoated with an acrylate pressure-sensitive adhesive of the following 4% solids composition 2000 g 90/10 isooctylacrylate/acrylic acid, inherent viscosity 1.4, at 28% solids in ethyl acetate;
12,000 g methylethylketone
4.64 g inert fluorinated alkyl ester nonionic surfactant at 50% solids (available from 3M).

The coated layer of the above composition was dried at 135° F. (57° C.) for 1½ minutes and also at 200° F. (93° C.) for an additional 1½ minutes. A suitable release sheet was laminated to the adhesive to prevent contamination by atmospheric dust and dirt. The dried adhesive coating weight was measured at 120 mg/ft$^2$ (1292 mg/m$^2$), about 0.05 mils (1.27 μm) thick. This was tape $A_1$.

Composition B

A composition the same as A was prepared except 4.50 gm TBC antioxidant [4,4'-thiobis(6-tert-butyl-m-cresol)] was added to the formulation.

B was coated, cured, and overcoated with the acrylate adhesive described above in making tape $A_1$, to yield a final product identical to $A_1$ in all respects except antioxidant. This was tape $B_1$.

Both tapes are $A_1$ and $B_1$ were then laminated to an exposed and developed 3M lithographic film, Type QA-4, by using a precision laminating machine. Tape $A_1$ was positioned in the machine with its liner being stripped and wound on the release sheet roller. The abrasion-resistant film tape its carrier were fed through the laminating rollers. After proper tracking and operation were established, a 50.8 cm×61.0 cm QA-4 negative was hand fed through the nip, and the 49.5 cm wide AR film tape and its carrier were laminated to the negative. After lamination was completed, the polyester carrier film was easily and cleanly removed leaving the 0.2 mil (5 μm) transfer film firmly attached to the negative. Tape $B_1$ was applied to another QA-4 negative in like manner.

Normal and accelerated aging tests were then performed on the protected lithographic films. The accelerated test consisted of 150° F. (66° C.) oven dwell. The failure criterion was the development of cracks in the sample.

Sample $A_1$ (without antioxidants) developed numerous hairline cracks after 72 hours dwell at 150° F. (66° C.). Signs of cracking were apparent in the normal aged sample after 4 months at room temperature.

Sample $B_1$ dwelled 23 days in a 150° F. (66° C.) oven before a 2" (5.1 cm) long hairline fracture occurred. No further change took place in a total of three months at 150° F. (66° C.). The room temperature aging counterpart remained unchanged after 7 months normal aging.

Repeat trials of the above experiment were performed substituting two other lots of precondensate (precondensate lots 49 and 51, 64% and 60% hydrolyzed, respectively) into the formulation. Without antioxidant, typical oven dwell time before cracking was 16 to 72 hours. With 1% TBC added, oven aging periods of three weeks or more were noted. If a crack did form, it did not propagate. No failures were noted in room temperature aging samples with TBC while those without failed within four months.

The antioxidant, HBP (4-hydroxymethyl-2,6-di-tert-butylphenol), was also evaluated. It also increased the dwell time at 150° F. (66° C.) before cracking occurred. It greatly limited the severity of cracking when it occurred, as had TBC. See tape examples $J_1$ and $K_1$.

About 1% antioxidant was an optimum level. Much higher levels (up to 10%) were attempted without further benefit. Examples $C_1$ and $K_1$ at the 2% level of antioxidant showed reduced, but useful, stability as compared to the examples at 1% and 0.5% levels. Above the 5% level, indications of incompatibility were noted.

The laminating process could be effected at room temperature. However, better initial optical properties and adhesion were realized at laminating temperatures between 100° and 150° F. (38°–66° C.).

Examples 1–11 are summarized in Table II.

TABLE II

Effect of Antioxidant on Aging

| Example | Tape Example | Precon Lot # [GPMS resin] | % Hydrolysis | Antioxidant Type & Amount | Accelerated Aging at 66° C., Amount of Cracking | Natural Aging at Room Temp., Amount of Cracking |
|---|---|---|---|---|---|---|
| 1 | $A_1$ | 57 | 60% | None | Severe cracking in 3 days | Cracking at 4 mos. |
| 2 | $B_1$ | 57 | 60% | 1% TBC | None in 3 weeks | None at 7 mos. |
| 3 | $C_1$ | 57 | 60% | 2% TBC | Tiny crack in 10 days, no further change 1 mo. | None at 7 mos. |
| 4 | $D_1$ | 57 | 60% | 0.5% TBC | None in 2 mos. | None at 6 mos. |
| 5 | $E_1$ | 49 | 64% | None | 16 hrs. Severe cracking | — |
| 6 | $F_1$ | 49 | 64% | 1% TBC | None in 2 mos. | None at 6 mos. |
| 7 | $G_1$ | 51 | 60% | None | 2 days many cracks | 2½ mos. to cracking |
| 8 | $H_1$ | 51 | 60% | 1% TBC | None in 6 wks. | None in 6 mos. |
| 9 | $I_1$ | 51 | 60% | 0.5% TBC | None in 6 wks. | None in 6 mos. |
| 10 | $J_1$ | 57 | 60% | 1% HBP | None in 7 days | None in 7 mos. |
| 11 | $K_1$ | 57 | 60% | 2% HBP | None in 7 days | None in 7 mos. |

EXAMPLES 12–13

The following examples show the independent importance of the degree of hydrolysis at 40% by weight epoxide content. (The composition was 60% by weight hydrolyzed precondensate monomers and 40% by weight epoxide.)

A special precon resin was prepared by increasing the total time of the hydrolysis reaction. Analytical methods deduced the level of hydrolysis to be 93% (MeO:Si=0.2:1). The 93% hydrolyzed precon lot 58 was substituted into composition A for precon lot 57 to yield a coating composition (L) identical to A of Example 1 except for the level of hydrolysis of the precon resin. Tape $L_1$ was prepared from this composition in the manner described for tape $A_1$ of Example 1. Another duplicate trial of composition A and tape $A_1$ was prepared as an experimental control. This new duplicate of $A_1$ was identified as $M_1$. Laminations of both $M_1$ and $L_1$ to lithographic negatives were prepared as previously described. Results of aging tests on these examples appear in Table III.

TABLE III

Degree of Hydrolysis and Aging

| Example | Tape Example | Precon Lot # GPMS resin | % Hydrolysis | Accelerated Aging at 66° C., Amount of Cracking | Natural Aging at Room Temperature, Amount of Cracking |
|---|---|---|---|---|---|
| 12 | L$_1$ | 58 | 93% | None in 7 wks | None in 6 mos. |
| 13 | M$_1$ | 57 | 60% | Several cracks in two days | Some cracking after 4 mos. |

EXAMPLES 14–17

Several examples utilizing precondensate lot 58 (GPMS resin, 93% hydrolyzed) were prepared at lower percent weight epoxide resin content to determine efficacy of harder compositions when formulated with highly hydrolyzed precondensate. Previous compositions formulated with 60% hydrolyzed precondensate failed both aging tests when less than 40% epoxide resin was utilized in the formulation. Composition N was formulated at 30% epoxide resin content. Composition O was formulated at 20% epoxide resin content.

Composition N 280.0 g AR precondensate Lot 58 (GPMS resin, 93% hydrolyzed)
120.0 g EEC
933.0 g isopropyl acetate
60.0 g bis(trifluoromethylsulfonyl)phenyl methane at 10% solids in isopropyl acetate
1.60 g inert fluorinated alkyl ester nonionic surfactant at 25% solids in isopropyl acetate (available from 3M)

Composition O 320.0 g AR precondensate Lot 58 (GPMS resin, 93% hydrolyzed)
80.0 g EEC
933.0 g isopropyl acetate
60.0 g bis(trifluoromethylsulfonyl)phenyl methane at 10% solids in isopropyl acetate
1.60 g inert fluorinated alkyl ester nonionic surfactant at 25% solids in isopropyl acetate Compositions N and O were used to produce tapes N$_1$ and O$_1$ in the manner described for Tape A$_1$ of Example 1. Tapes N$_1$ and O$_1$ were than laminated to lithographic negatives and tested in the manner described for Tape A$_1$. These results appear in Table IV.

In general, the rate, severity, and frequency of cracking was greatly reduced when highly hydrolyzed precons were used in a given formulation. If an antioxidant was added, further stabilization was noted. This is consistent with the invention.

EXAMPLES 18–23

These examples demonstrate the importance of antioxidant class.

An abrasion resistant coating composition of the following formulation was prepared.

Composition R 180.0 g AR precondensate Lot 49 (GPMS resin) MeO:Si=1.1:1 (63% hydrolyzed)
120.0 g EEC
700.0 g isopropyl acetate
45.0 g bis(trifluoromethylsulfonyl)phenyl methane at 10% solids in isopropyl acetate
1.20 g inert fluorinated alkyl ester nonionic surfactant at 25% solids in isopropyl acetate The composition was 40% by weight epoxide resin and was merely a scaled down version of the composition in Example 1. Various antioxidants were substituted into composition R, as described in the following table.

TABLE V

| Identification | Antioxidant Description | Amount & % |
|---|---|---|
| Comp. R | None | — |
| S | Amine Type, APA | 3.00 gm, 1% |
| T | Thioester Type, DLTDP | 3.00 gm, 1% |
| U | Phosphite Type, TNP | 3.00 gm, 1% |
| V | Hydroquinone Type, DAH | 3.00 gm, 1% |
| W | Polyphenol Type, BHB | 3.00 gm, 1% |

A pressure-sensitive acrylate adhesive (5% solids) was prepared as follows:

1716.0 g 90/10 isooctyl acrylate/acrylic acid, inherent viscosity 0.7 in ethyl acetate at 40.8% solids
12,284 g methyl ethyl ketone
2.80 g inert fluorinated alkyl ester nonionic surfactant at 50% solids (available from 3M).

Tapes were prepared and tested in the manner previously described for tape A$_1$ in Example 1. Results of the tests are documented below in Table VI.

TABLE IV

Aging of Lower Epoxide Content Compositions

| Example | Tape Example | Precon Lot # [GPMS resin] | % EEC in Composition | Antioxidant Type & Amount | Accelerated Aging at 66° C. | Natural Aging at Room Temp. |
|---|---|---|---|---|---|---|
| 14 | N$_1$ | 58 | 30% | None | Minor crack in five days | Numerous cracks in 6 mos. |
| 15 | O$_1$ | 58 | 20% | None | Severe failure in two days | Numerous cracks in 6 mos. |
| 16 | P$_1$ | 58 | 30% | 1% TBC | Minor crack in five days | Two minor cracks in 6 mos. |
| 17 | Q$_1$ | 58 | 20% | 1% TBC | Severe failure in two days | Several cracks in 6 mos. |

TABLE VI

Antioxidants and Aging

| Example | Tape Example | Antioxidant Type and Amount | Accelerated Aging at 66° C. | Comments |
|---|---|---|---|---|
| 18 | R$_1$ | None (control) | Two full length [24" (61 cm)] | Cracks continue |

TABLE VI-continued

| | | | Antioxidants and Aging | |
|---|---|---|---|---|
| Example | Tape Example | Antioxidant Type and Amount | Accelerated Aging at 66° C. | Comments |
| | | | open cracks are formed in 16 hrs. | to widen with time. |
| 19 | S₁ | 1% APA (Amine Type) | Three 6" (15.25 cm) formed in 16 hrs. | More cracks form with time. |
| 20 | T₁ | 1% DLTDP (Thioester Type) | No cracks-3 weeks | Probably as good as TBC |
| 21 | U₁ | 1% TNP (Phosphite Type) | One 6" (15.25 cm) long crack in 16 hrs. propagates full length by 72 hrs. | More cracks form with time. |
| 22 | V₁ | 1% DAH (Hydroquinone Type) | One 3" (7.6 cm) long crack in 16 hrs. Two 3" (7.6 cm) long cracks in 72 hrs. | Crack does not propogate |
| 23 | W₁ | 1% BHB (Polyphenol Type) | One 6" (15.25 cm) long crack in 16 hrs. Two 6" (15.25 cm) long cracks in 72 hrs. | Crack Propogation extremely slow Crack Propogation extremely slow |

All the antioxidants tested in this series showed at least modest improvements in stability compared to the control tape R₁. The most preferred antioxidant for use in this invention is TBC. Other preferred antioxidants are DLTDP and phenol types of antioxidants.

What is claimed is:

1. A multilayered sheet of material for providing a transferrable abrasion-resistant coating capable of lamination comprising in sequence
   a. a strippable carrier substrate;
   b. a flexible abrasion-resistant coating on the said carrier substrate wherein said coating is from 1.27 to 25.4 μm thick and comprises a polymer which has at most 30% haze according to ASTM D 968-51 using 1 liter of sand in 10–11 seconds, said polymer having
   (1) 25 to 60% by weight units derived from precondensed monomers which are epoxy-terminated silanes of the formulae

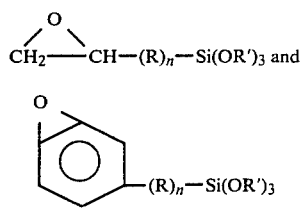

and wherein R is selected from alkylene of 1 to 10 carbon atoms and —CH₂—O—(CH₂)ₘ, wherein m is 1 to 5, n is 1, and R' is selected from alkyl of 1 to 8 carbon atoms,
   (2) 40 to 75% by weight units derived from epoxidized organic compounds other than epoxy silanes, and
   (3) from 0.1 to 5% by weight of an antioxidant;
   c. a coated pressure-sensitive adhesive layer which is from 0.5 to 13 μm thick; and
   d. a strippable release sheet comprised of a liner substrate with a low adhesion backsize;
wherein
   the release force between the abrasion-resistant coating, peeled at a 180° angle, and the carrier substrate is <25 g/2.54 cm width, and
   the release force between the release sheet, peeled at a 180° angle, and the pressure-sensitive adhesive coating is <10 g/2.54 cm width.

2. A multilayered sheet material according to claim 1 wherein R of the abrasion-resistant coating polymer is selected from alkylene of 2 to 8 carbon atoms, and R' of the abrasion resistant coating polymer is selected from alkyl of 1 to 4 carbon atoms.

3. A multilayered sheet material according to claim 1 wherein the abrasion-resistant coating polymer comprises 40 to 55% by weight units derived from an epoxy-terminated silane precondensed monomers and 45 to 60% by weight units derived from epoxidized organic compounds other than epoxy silanes.

4. A multilayered sheet material according to claim 1 wherein the abrasion-resistant coating polymer comprises 55 to 60% by weight units derived from an epoxy-terminated silane precondensed monomers and 40 to 45% by weight units derived from epoxidized organic compounds other than epoxy silanes.

5. A multilayered sheet material according to claim 1 wherein the precondensed monomers of the abrasion-resistant coating polymer are 35 to 95% hydrolyzed.

6. A multilayered sheet material according to claim 1 wherein the precondensed monomers of the abrasion-resistant coating polymer are 60 to 95% hydrolyzed.

7. A multilayered sheet material according to claim 1 wherein the abrasion-resistant coating was cured in the presence of a catalytically effective amount of a strong Bronsted acid.

8. A multilayered sheet material according to claim 7 wherein the strong Bronsted acid is bis(trifluoromethylsulfonyl)phenyl methane.

9. A multilayered sheet material according to claim 1 wherein the antioxidant in the abrasion resistant coating is present in an amount from 0.25 to 2% by weight of the abrasion-resistant coating.

10. A multilayered sheet material according to claim 1 wherein the antioxidant in the abrasion resistant coating is present in an amount of about 1% by weight of the abrasion-resistant coating.

11. A multilayered sheet material according to claim 1 wherein the antioxidant in the abrasion resistant coating is selected from the group comprising 4,4'-thiobis-(6-tert-butyl-m-cresol), dilaurylthiodipropionate, 1,3,5-trimethyl-2,4,6-tris (3,5-di-tert-butyl-4-hydroxybenzyl)benzene, and phenol-type antioxidants.

12. A multilayered sheet material according to claim 1 wherein the carrier substrate is a polyethylene terephthalate film.

13. A process for applying a flexible abrasion-resistant coating to a solid substrate which process comprises the steps of providing the multilayered sheet of claim 1 and a. peeling off the strippable release sheet to expose the adhesive layer;

b. contacting said adhesive layer of said multilayered sheet with the solid substrate to be protected;

c. using pressure to laminate said flexible abrasion-resistant coating to said solid substrate; and d. peeling off the strippable carrier substrate to expose the flexible abrasion-resistant coating.

14. A process according to claim 13 wherein lamination takes place at temperatures of 38° to 66° C.

* * * * *